(12) United States Patent
Klein

(10) Patent No.: US 11,734,088 B2
(45) Date of Patent: Aug. 22, 2023

(54) LOW-POWER SCALABLE NODES

(71) Applicant: Kioxia Corporation, Tokyo (JP)

(72) Inventor: Yaron Klein, Raanana (IL)

(73) Assignee: KIOXIA CORPORATION, Tokyo (JP)

( * ) Notice: Subject to any disclaimer, the term of this patent is extended or adjusted under 35 U.S.C. 154(b) by 0 days.

(21) Appl. No.: 17/689,696

(22) Filed: Mar. 8, 2022

(65) Prior Publication Data

US 2022/0197724 A1 Jun. 23, 2022

Related U.S. Application Data

(63) Continuation of application No. 16/252,526, filed on Jan. 18, 2019, now Pat. No. 11,269,695.

(51) Int. Cl.
| | | |
|---|---|---|
| *G06F 9/54* | (2006.01) |
| *H04L 67/1097* | (2022.01) |
| *H02J 7/35* | (2006.01) |
| *G06F 12/0813* | (2016.01) |
| *H04W 84/20* | (2009.01) |
| *H04L 67/1074* | (2022.01) |

(52) U.S. Cl.
CPC .......... *G06F 9/542* (2013.01); *G06F 12/0813* (2013.01); *H02J 7/35* (2013.01); *H04L 67/1074* (2013.01); *H04L 67/1097* (2013.01); *H04W 84/20* (2013.01)

(58) Field of Classification Search
None
See application file for complete search history.

(56) References Cited

U.S. PATENT DOCUMENTS

| | | |
|---|---|---|
| 2007/0027948 A1 | 2/2007 | Engebretsen |
| 2013/0297949 A1 | 11/2013 | Sun |
| 2016/0364346 A1 | 12/2016 | Yang et al. |
| 2017/0134349 A1 | 5/2017 | Ahmed et al. |
| 2018/0139683 A1 | 5/2018 | Kwon et al. |

*Primary Examiner* — Syed A Roni
(74) *Attorney, Agent, or Firm* — Foley & Lardner LLP

(57) ABSTRACT

Various implementations described herein relate to a system including multiple nodes. Each node is one of a storage node, a compute node, or a computer-and-storage node. Each node includes a Bluetooth® connector configured to communicate over a Bluetooth® mesh network.

20 Claims, 5 Drawing Sheets

LOW-POWER SCALABLE NODES

CROSS-REFERENCE TO RELATED APPLICATION

This application is a continuation of U.S. patent application Ser. No. 16/252,526, filed Jan. 18, 2019, now U.S. Pat. No. 11,269,695, the entire contents of all of which are incorporated herein by reference.

TECHNICAL FIELD

The present disclosure generally relates generally to systems and methods for providing lower-power, scalable nodes in a datacenter or compute systems.

BACKGROUND

Traditionally, a large-scale datacenter or compute system includes compute nodes, storage nodes, compute-and-storage nodes, and network infrastructure connecting the nodes and other components of the datacenter or compute system. Storage node store data. Compute nodes retrieve the data stored by the storage nodes and process the data, returning processed data to the storage nodes. A compute-and-storage node has both storage and computing capabilities. A network is implemented to transfer data from the storage nodes to the compute nodes, vice versa.

Traditionally, compute nodes, storage nodes, and compute-and-storage nodes are housed in large enclosures (e.g., racks). The enclosures are usually populated with large drives that provide storage capabilities for the storage nodes or multiple cores that provide computing capabilities for the compute nodes. The network infrastructure includes physical cables that connect the nodes via switches (e.g., a top-of-rack (TOR) switch of a rack). Such enclosures have high power consumption and occupy large space. Additional power is consumed for cooling the large space occupied by the enclosures. For example, racks containing several computing and storage nodes typically occupy in the order of a square meter per rack and will have a typical rack power density reaching 7-10 kW per rack. Hence, a traditional datacenter with 10s of thousands of nodes in thousands of racks consumes several MW of power and occupies thousands of square meters.

SUMMARY

In certain aspects, the present implementations of datacenters or compute systems are directed to providing lower-power, scalable nodes connected by a Bluetooth® mesh network.

DETAILED DESCRIPTION

Among other aspects, Applicant notes the high space consumption and high power consumption of traditional datacenters and compute systems. Implementations described herein relate to constructing or otherwise providing a scalable, low-power, and low-cost datacenter or a compute system that includes small-sized nodes connected to one another via a wireless Bluetooth® mesh network. Each node can be a compute node, a storage node, or a compute-and-storage node. A compute node includes one or more processing cores (e.g., processing units such as but not limited to, CPUs) on a single circuit board. A storage node includes a controller and a non-volatile storage having NAND chips. A compute-and-storage node includes both storage elements (e.g., one or more NAND chips) to store data and compute elements (e.g., one or more processing cores) to process the data stored in the storage elements of the same node.

To lower power consumption, to minimize size of each node, and to improve scalability, each node includes a Bluetooth® Low Energy (LE) wireless connector configured to connect the node to a Bluetooth® mesh network. The nodes communicate with one another via the Bluetooth® mesh network in the manner described. The nodes can communicate using a layered architecture of the Bluetooth® mesh network. In that regard, each node does not rely on network cables or TOR switches of a rack for network connection, and instead can communicate with other nodes wirelessly.

In some arrangements, each node includes an on-board power supply such as but not limited to, a battery, a rechargeable battery, a solar-charged (photovoltaic) battery, or any other on-board power supply. In some examples, each node may include a power generator such as but not limited to, one or more photovoltaic or solar panels, one or more wind turbines, and so on. The power generator on a node is configured to provide power to the on-board power supply of that node. In that regard, each node does not rely on any external power supply or power cables.

Accordingly, the nodes described herein are low-power, low-cost, and occupy less space. Each of the node can be a standalone unit in that physical power infrastructure and physical network infrastructure (e.g., power and network cables, power and network switches, and so on) between the nodes are not needed due to the fact that each node generates and/or stores its own power and communicates with other nodes wirelessly. To up-scale the system, one or more additional nodes can be placed within wireless communication range of at least one existing node of the system, and a manager of the Bluetooth® mesh network can facilitate discovering and adding of the one or more additional nodes to the Bluetooth® mesh network in the manner described.

Figure 1:
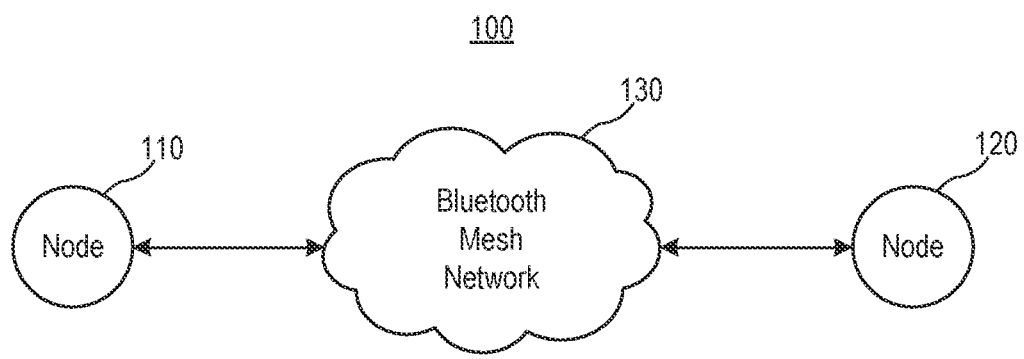
FIG. 1 is a block diagram showing a system including nodes configured to communicate via a Bluetooth® mesh network, according to some implementations.

To assist in illustrating certain aspects of the present implementations, FIG. 1 shows a block diagram of a system 100 including nodes 110 and 120. The system 100 corresponds to a datacenter, a compute system, or another suitable system having multiple nodes configured to store data and/or process data for a host (not shown). The host may be a user device operated by a user. The system 100 may include additional nodes not shown for clarity; the nodes 110 and 120 are representative of any two given nodes of the system 100 in that any two nodes of the system 100 can communicate via a Bluetooth® mesh network 130, instead of physical network cables in traditional datacenters or compute systems.

In some examples, the Bluetooth® mesh network 130 is implemented using a protocol based on Bluetooth® LE, which enables many-to-many and one-to-many communications over Bluetooth® radio. In some example, the Bluetooth® mesh network 130 provides for a large number (e.g., 32767) nodes to communicate with each other. A source node (e.g., the node 110) can send a message, data, or information to single destination node (e.g., the node 120) or a group of destination nodes in the manner described.

Figure 2A:
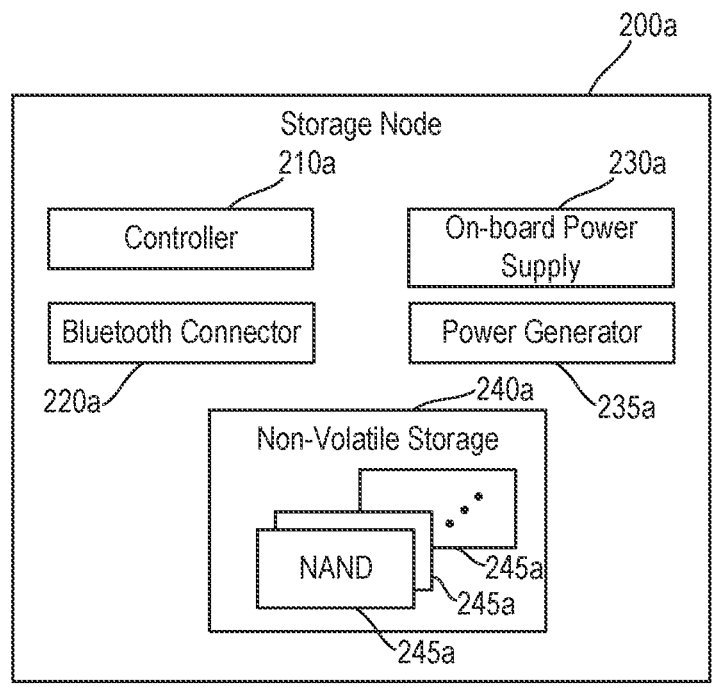
FIG. 2A is a block diagram showing a storage node, according to some implementations.
Figure 2B:
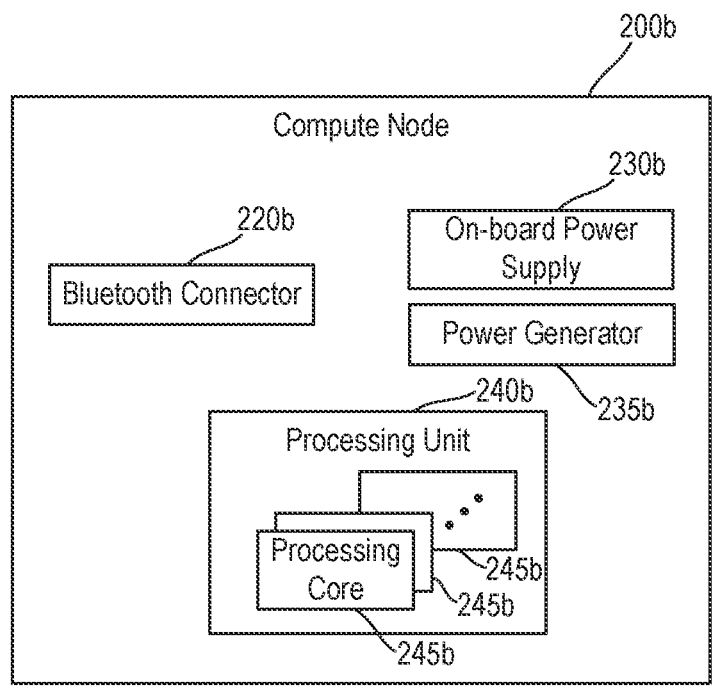
FIG. 2B is a block diagram showing a compute node, according to some implementations.
Figure 2C:
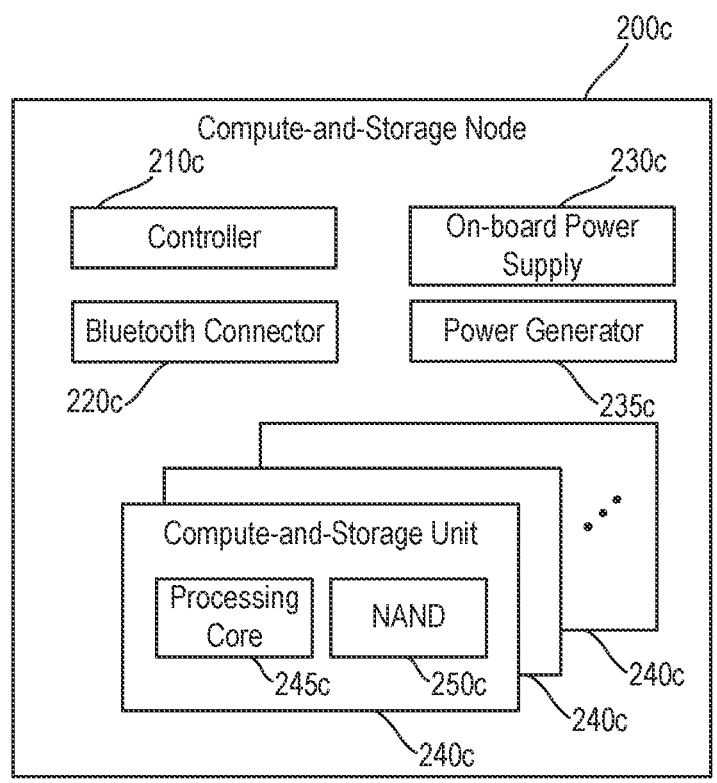
FIG. 2C is a block diagram showing a compute-and-storage node, according to some implementations.

FIG. 2A is a block diagram showing a storage node 200a, according to some implementations. FIG. 2B is a block diagram showing a compute node 200b, according to some implementations. FIG. 2C is a block diagram showing a compute-and-storage node 200c, according to some implementations. Referring to FIGS. 1-2C, each of the node 110 or 120 can be one of the storage node 200a, the compute node 200b, or the compute-and-storage node 200c.

In some arrangements, the storage node 200a includes a controller 210a, a Bluetooth® connector 220a, an on-board power supply 230a, a power generator 235a, and a non-volatile storage 240a. As shown, the non-volatile storage 240a includes NAND flash memory devices 245a (e.g., NAND chips). The NAND flash memory devices 245a are flash memory. Each of the NAND flash memory devices 245a includes one or more individual NAND flash dies, which are non-volatile memory devices capable of retaining data without power. Thus, the NAND flash memory devices 245a refer to a plurality of NAND flash memory devices or dies. In that regard, the non-volatile storage 240a may correspond to a solid state drive (SSD). In other arrangements, the non-volatile storage 240a includes other non-volatile memory technologies such as but not limited to, Magnetic Random Access Memory (MRAM) devices, Phase Change Memory (PCM) devices, Ferro-Electric RAM (Fe-RAM) devices, and so on. Alternative to the non-volatile storage 240a, the storage node 200a may include another suitable storage device for storing data.

The controller 210a can combine raw data storage in the NAND flash memory devices 245a such that those NAND flash memory devices 245a function like a single storage. The controller 210a can include microcontrollers, buffers, error correction functionality, Flash Translation Layer (FTL) and flash interface modules, software, and firmware for implementing such functions. In some arrangements, the software/firmware can be stored in the non-volatile storage 240a or in any other suitable computer readable storage medium.

The controller 210a includes suitable processing and memory capabilities for executing functions described herein, among other functions. As described, the controller 210a manages various features for the NAND flash memory devices 245a including, but not limited to, I/O handling, reading, writing, erasing, monitoring, logging, error handling, garbage collection, wear leveling, logical to physical address mapping, and the like. Thus, the controller 210a provides visibility to the NAND flash memory devices 245a and FTLs associated thereof.

The Bluetooth® connector 220a may be a network interface configured to connect the storage node 200a to the Bluetooth® mesh network 130. In that regard, the Bluetooth® connector 220a includes to any suitable hardware (e.g., a Bluetooth® wireless module) and software configured to send and receive data, messages, or information using the Bluetooth® standard. In some examples, the Bluetooth® connector 220a is a Bluetooth® LE wireless connector for connecting to a Bluetooth® LE network. The data stored in the non-volatile storage 240a can be sent, via the Bluetooth® connector 220a, over the Bluetooth® mesh network 130 to a compute node (e.g., the compute node 200b) for reading and/or processing. The Bluetooth® connector 220a can also receive data from a compute node or a host for writing to the non-volatile storage 240a.

The on-board power supply 230a provides power to the controller 210a, the non-volatile storage 240, the Bluetooth® connector 220a, and other components (not shown) of the storage node 200a. The on-board power supply 230a is "on-board," meaning that the on-board power supply 230a disposed within or on a housing of the storage node 200a. In some examples, the on-board power supply 230a can be moved with the rest of the storage node 200a as a unit. Examples of the on-board power supply 230a include but are not limited to, a battery, a rechargeable battery, a solar-charged battery, and so on.

In some implementations, the on-board power supply 230a does not connect to any power sources and/or power cables that are external to the housing of the storage node 200a. The power generator 235a is provided to supply power to (e.g., to recharge) the on-board power supply 230a. Examples of the power generator 235a include but are not limited to, one or more photovoltaic or solar panels, one or more wind turbines, and so on.

In other implementations, the on-board power supply 230a is configured to wirelessly couple to an external power source (external to the housing of the storage node 200a), for example, via suitable wireless charging devices to be periodically recharged.

In some arrangements, the compute node 200b includes a Bluetooth® connector 220b, an on-board power supply 230b, a power generator 235b, and a processing unit 240b. As shown, the processing unit 240b includes multiple processing cores 245b. The processing cores 245b allow the compute node 200b to read, write, or otherwise process data stored in the storage node 200a, responsive to corresponding commands received from the host. Examples of the processing cores 245b include but are not limited to, CPUs. In some examples, two or more or all of the CPUs are disposed on a single circuit board. In other examples, a processing unit 240b may comprise an ASIC (Application Specific Integrated Circuit) with one or more processing cores 245b and memory (not shown for clarity, but which may be volatile memory for data processing and caching or non-volatile memory for program and data storage).

The Bluetooth® connector 220b may be a network interface configured to connect the compute node 200b to the Bluetooth® mesh network 130, similar to the Bluetooth® connector 220a. For example, the Bluetooth® connector 220b includes to any suitable hardware (e.g., a Bluetooth® wireless module) and software configured to send and receive data, messages, or information using the Bluetooth® standard. In some examples, the Bluetooth® connector 220b is a Bluetooth® LE wireless connector for connecting to a Bluetooth® LE network. The Bluetooth® connector 220b can receive data from a storage node for reading and/or processing. The Bluetooth® connector 220b can send data to a storage node for writing. The Bluetooth® connector 220b can receive data and/or commands from the host in some examples.

The on-board power supply 230*b* provides power to the processing unit 240*b*, the Bluetooth® connector 220*b*, and other components (not shown) of the compute node 200*b*. Similar to the on-board power supply 230*a*, the on-board power supply 230*b* is disposed within or on a housing of the compute node 200*b*. In some examples, the on-board power supply 230*b* can be moved with the rest of the compute node 200*b* as a unit. Examples of the on-board power supply 230*b* include but are not limited to, a battery, a rechargeable battery, a solar-charged battery, and so on.

In some implementations, the on-board power supply 230*b* does not connect to any power sources and/or power cables that are external to the housing of the compute node 200*b*. The power generator 235*b* is provided to supply power to (e.g., to recharge) the on-board power supply 230*b*, similar to the power generator 235*a*. Examples of the power generator 235*b* include but are not limited to, one or more photovoltaic or solar panels, one or more wind turbines, and so on.

In other implementations, the on-board power supply 230*b* is configured to wirelessly couple to an external power source (external to the housing of the compute node 200*b*), for example, via suitable wireless charging devices to be periodically recharged.

The compute-and-storage node 200*c* includes both storage elements to store data and compute elements to process the data stored in the storage elements of the compute-and-storage node 200*c*. In some arrangements, the compute-and-storage node 200*c* includes a controller 210*c*, a Bluetooth® connector 220*c*, an on-board power supply 230*c*, a power generator 235*c*, and one or more compute and storage units 240*c*.

Each of the compute-and-storage units 240*c* includes at least one processing core 245*c* (such as but not limited to, the processing core 245*b*) and at least one NAND memory device 250*c* (such as but not limited to, the NAND memory device 245*a*). The processing core 245*c* is configured to perform read, write, or other processing functions for the data stored in the NAND memory device 250*c* of the same compute-and-storage unit 240*c* or a different compute-and-storage unit of the compute-and-storage node 200*c*.

The Bluetooth® connector 220*c* may be a network interface configured to connect the compute-and-storage node 200*c* to the Bluetooth® mesh network 130, similar to the Bluetooth® connectors 220*a* and 220*b*. For example, the Bluetooth® connector 220*c* includes to any suitable hardware (e.g., a Bluetooth® wireless module) and software configured to send and receive data, messages, or information using the Bluetooth® standard. In some examples, the Bluetooth® connector 220*c* is a Bluetooth® LE wireless connector for connecting to a Bluetooth® LE network. The Bluetooth® connector 220*c* can send data to and receive data from another node in the Bluetooth® mesh network 130. The Bluetooth® connector 220*c* can receive data and/or commands from the host in some examples.

The on-board power supply 230*c* provides power to the controller 210*c*, the compute-and-storage units 240*c*, the Bluetooth® connector 220*c*, and other components (not shown) of the compute-and-storage node 200*c*. Similar to the on-board power supplies 230*a* and 230*b*, the on-board power supply 230*c* is disposed within or on a housing of the compute-and-storage node 200*c*. In some examples, the on-board power supply 230*c* can be moved with the rest of the compute-and-storage node 200*c* as a unit. Examples of the on-board power supply 230*c* include but are not limited to, a battery, a rechargeable battery, a solar-charged battery, and so on.

In some implementations, the on-board power supply 230*c* does not connect to any power sources and/or power cables that are external to the housing of the compute-and-storage node 200*c*. The power generator 235*c* is provided to supply power to (e.g., to recharge) the on-board power supply 230*c*, similar to the power generators 235*a* and 235*b*. Examples of the power generator 235*c* include but are not limited to, one or more photovoltaic or solar panels, one or more wind turbines, and so on.

In other implementations, the on-board power supply 230*c* is configured to wirelessly couple to an external power source (external to the housing of the compute-and-storage node 200*c*), for example, via suitable wireless charging devices to be periodically recharged.

Figure 3:
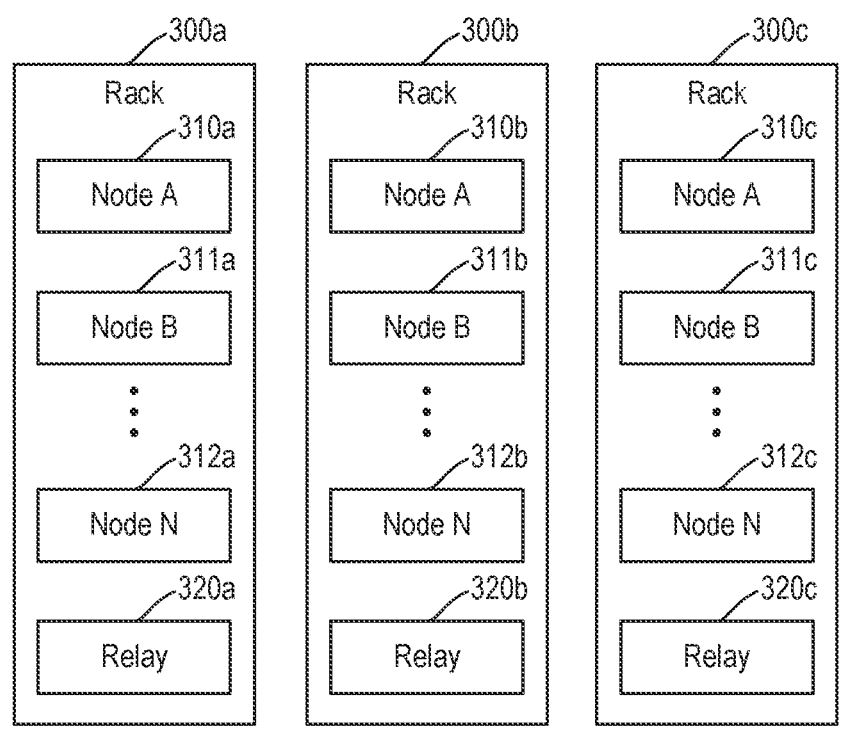
FIG. 3 is a block diagram showing racks, according to some implementations.

FIG. 3 is a block diagram showing racks 300*a*-300*c*, according to some implementations. Referring to FIGS. 1-3, nodes 310*a*-312*a* are installed in the rack 300*a*. Nodes 310*b*-312*b* are installed in the rack 300*b*. Nodes 310*c*-312*c* are installed in the rack 300*c*. The racks 300*a*-300*c* are mechanical platforms, cabinets, or pods that provide structural support for the nodes 310*a*-312*a*, 310*b*-312*b*, and 310*c*-312*c*. While the nodes 310*a*-312*a*, 310*b*-312*b*, and 310*c*-312*c* are shown, each of the racks 300*a*-300*c* can support any number of nodes.

Each of the nodes 310*a*-312*a*, 310*b*-312*b*, and 310*c*-312*c* may be the storage node 200*a*, the compute node 200*b*, or the compute-and-storage node 200*c*. In that regard, each of the nodes 310*a*-312*a*, 310*b*-312*b*, and 310*c*-312*c* includes a Bluetooth® connector 220*a*, 220*b*, or 220*c* configured to provide connectivity to the Bluetooth® mesh network 130. Therefore, the racks 300*a*-300*c* does not need any TOR switches or any other network devices for providing connectivity for the nodes 310*a*-312*a*, 310*b*-312*b*, and 310*c*-312*c*.

Each of the nodes 310*a*-312*a*, 310*b*-312*b*, and 310*c*-312*c* includes an on-board power supply 230*a*, 230*b*, or 230*c*. Therefore, the racks 300*a*-300*c* do not need any power supplies external to the nodes 310*a*-312*a*, 310*b*-312*b*, and 310*c*-312*c*. In the examples in which the nodes 310*a*-312*a*, 310*b*-312*b*, and 310*c*-312*c* have the power generators 235*a*, 235*b*, and 235*c* that are photovoltaic or solar panels, the racks 300*a*-300*c* are structurally configured to expose the photovoltaic or solar panels to the sun, such that the photovoltaic or solar panels can provide power to the nodes 310*a*-312*a*, 310*b*-312*b*, and 310*c*-312*c* in the manner described. In other words, the racks 300*a*-300*c* structurally support the photovoltaic or solar panels at positions and orientations such that the photovoltaic or solar panels can face the sun.

In the examples in which the nodes 310*a*-312*a*, 310*b*-312*b*, and 310*c*-312*c* have the power generators 235*a*, 235*b*, and 235*c* that are wind turbines, the racks 300*a*-300*c* are structurally configured to expose the wind turbines to air, such that the wind turbines can provide power to the nodes 310*a*-312*a*, 310*b*-312*b*, and 310*c*-312*c* in the manner described. In other words, the racks 300*a*-300*c* structurally support the wind turbines at positions and orientations such that the wind turbines can face the fastest air flow available.

As the nodes 310*a*-312*a*, 310*b*-312*b*, and 310*c*-312*c* include low-energy components, minimal air-conditioning is needed to cool the racks 300*a*-300*c*. Thus, energy needed for air-conditioning can be further conserved.

In a large datacenter, a node from one rack may not be able to achieve direct radio contact with another node from another rack, where a distance between the racks (e.g., between the nodes) exceed a range (e.g., about 100 m) of the Bluetooth® radio. The Bluetooth® mesh network 130 allows nodes to communicate with each other over a large area via "hops." For example, a distance between the racks 300a and 300c may exceed the range of the Bluetooth connectors 220a-220c such that any node in the rack 300a cannot directly communicate (e.g., directly transmit messages, data, and information) with any node in the rack 300c. If the node A 310a were to communicate with the node B 311c, the Bluetooth® mesh network 130 enables the node A 310a to communicate with one or more of the nodes 310b-312b in the rack 300b, and the one or more of the nodes 310b-312b can relay (e.g., retransmit) the communication to the node B 311c. Therefore, the nodes 310a and 311c can communicate via hops (e.g., the one or more of the nodes 310b-312b). In this manner, each of the nodes 310a-312a, 310b-312b, and 310c-312c can be a relay or hop for other nodes, providing connectivity over a large area.

In some examples, each of the racks 300a-300c includes a respective one of relays 320a-320c. The relays 320a-320c are Bluetooth® relay devices configured to retransmit messages, data, and information from a first node to a second node, where a distance between the first and second nodes may exceed the range of the Bluetooth® radio. That is, a relay (e.g., one of the relays 320a-320c) can receive messages, data, and information from a first node (on a same or different rack as the relay) that is addressed to or otherwise intended for a second node via the Bluetooth® mesh network 130, and transmit the messages, data, and information to the second node (on a same or different rack as the relay) or to another node (on a same or different rack as the relay) with relay capabilities that is located closer to the second node via the Bluetooth® mesh network 130. In that regard, each of the relays 320a-320c includes at least a Bluetooth® connector such as but not limited to, the Bluetooth® connectors 220a-200c.

In some examples, the relays 320a-320c are devices that are dedicated to relaying messages, data, and information for the Bluetooth® mesh network 130. In that regard, the relays 320a-320c may not have any compute and storage capabilities similar to those described with respect to the nodes 200a-200c. In other examples, each of the relays 320a-320c is one of the nodes 200a-200c with relay capabilities. A node configured for relay capabilities can receive messages, data, and information (originally published by an origin node) that is addressed to or otherwise intended for a destination node and retransmit the messages, data, and information to the destination node or to another node with relay capabilities that is located closer to the destination node.

Thus, the relay capabilities of the Bluetooth® mesh network 130 allow a destination node that is not in radio range of the origin node to receive communications originally published by the origin node. Messages, data, and information may be relayed multiple times, over hops. In one example, a maximum number of 127 hops are possible in the Bluetooth® mesh network 130—enough to relay messages, data, and information across an enormous physical area. That is, such a network can to carry messages, data, and information over 127 racks (e.g., the racks 300a-300c).

On the other hand, a node without relay capabilities can receive messages, data, and information addressed to or otherwise intended for that node, and can send messages, data, and information addressed to or otherwise intended for a destination node to the destination node or a node with relay capabilities that is located closer to the destination node. In other words, a node without relay capabilities can only be an origin node or a destination. Any of the nodes 310a-312a, 310b-312b, and 310c-312c may be a node without any relay capabilities.

Figure 4:
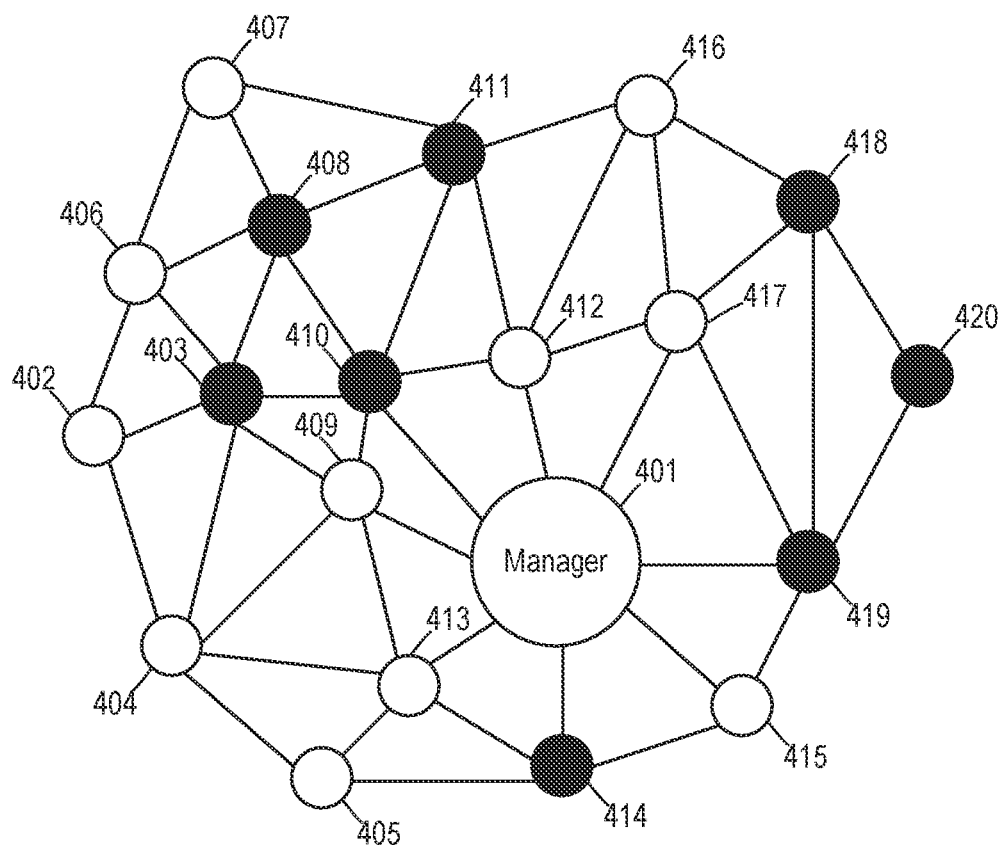
FIG. 4 is a schematic diagram showing various nodes connected by a Bluetooth® mesh network, according to some implementations.

FIG. 4 is a schematic diagram showing various nodes 402-420 connected by the Bluetooth® mesh network 400, according to some implementations. Referring to FIGS. 1-4, the Bluetooth® mesh network 400 is an example implementation of the Bluetooth® mesh network 130. Each of the nodes 402-420 may be a node such as but not limited to, the nodes 110, 120, 310a-312a, 310b-312b, and 310c-312c. Each of the nodes 402-420 may be the storage node 200a, the compute node 200b, the compute-and-storage node 200c, or a relay (e.g., the relays 320a-320c). As shown, the Bluetooth® mesh network 400 has a mesh-like architecture, with each of the nodes 402-420 being at least one of an origin node, a destination node, or a relay (hop). The locations of the nodes 402-420 illustrate physical locations. That is, the Bluetooth® mesh network 400 allows the node 402 to link to the nodes 403, 404, and 406. In other for the node 403 to send/receive messages, data, or information to/from other nodes in the Bluetooth® mesh network 400, relay(s) may needed.

The nodes 402-420 can communicate with one another by subscribing to a predefined segmentation (e.g., a group of nodes) and publishing message, data, or information to a channel supported by the Bluetooth® mesh network 400, where the channel corresponds to the predefined segment. Using the one-to-many and many-to-many communication features of the Bluetooth® mesh network 400, an origin node can send messages, data, or information through the channel (via relays, if needed) to one or more nodes within the predefined segment. For example, nodes 403, 408, 410, 411 414, 418, and 419 belong to a predefined segment (e.g., "Storage: Row1") corresponding to a high-level concept that can be defined by the user. Each of the nodes 403, 408, 410, 411 414, 418, and 419 has an address that is associated with (e.g., mapped to) the predefined segment. One or more of the nodes 403, 408, 410, 411 414, 418, and 419 may belong to another predefined segment. Each of the nodes 403, 408, 410, 411 414, 418, and 419 can publish messages, data, or information on the channel corresponding to the predefined segment. That is, each of the nodes 403, 408, 410, 411 414, 418, and 419 can send the messages, data, or information to one or more other ones of the nodes 403, 408, 410, 411 414, 418, and 419 via the channel. Each of the nodes 403, 408, 410, 411 414, 418, and 419 can subscribe to the predefined segment, meaning that each of the nodes 403, 408, 410, 411 414, 418, and 419 can receive messages, data, or information from other ones of the nodes 403, 408, 410, 411 414, 418, and 419 via the channel. For instance, in order for the node 403 to publish a message to the node 418 that is in the same predefined segment as the node 403, the message may be relayed by the nodes 410, 412, 417 in one path. In another path, in order for the node 403 to publish a message to the node 418, the message may be relayed by the nodes 408, 411, 416. That is, the message can be relayed by nodes that are not in the same predefined segment.

Every message or units of data/information sent via the Bluetooth® mesh network 400 includes a source address and a destination address. Based on the destination address, an intermediate relay can identify the destination node (which processes the messages or units of data/information) corresponding to the destination address. As described herein, a node can publish messages to one or more or all of nodes of a same predetermined segment. In additional examples, a node can publish messages to any single node in the Bluetooth® mesh network 400, one or more or all of nodes of another predetermined segment, or all nodes in the Bluetooth® mesh network 400. Each message has a sequence number intended to protect the Bluetooth® mesh network 400 against replay attacks.

In some examples, a user (e.g., a provider) can upscale the datacenter or the compute system (e.g., corresponding to the system 100) by inserting new nodes upon requirement. Each of the new nodes may be the storage node 200*a*, the compute node 200*b*, the compute-and-storage node 200*c*, or the relay (e.g., the relays 320*a*-320*c*). The new nodes can be structurally supported by racks (e.g., the racks 300*a*-300*c*) as described. In that regard, new racks can be likewise provided to support the new nodes.

The new nodes are configured to publish themselves and subscribe to predefined segments. A central manager 401 is configured to discover the new nodes, to assign processing tasks to new compute nodes, and to assign data to storage nodes. In one example, responsive to a new node being connected to the Bluetooth® mesh network 400, the new node may publish an authentication message (e.g., including authentication keys) to only the central manager 401, using the address of the central manager 401. The new node may not yet be able to publish/subscribe to other nodes in the Bluetooth® mesh network 400. The central manager 401 may authenticate the new node based on the authentication message and allow the new node to publish/subscribe to other nodes or predefined segments as a response. In other examples, responsive to the central manager 401 authenticating the new node, the central manager may identify the function (e.g., compute, storage, compute-and-storage, relay, and so on) of the new node and assign a task (e.g., data processing, data storage, relaying data, and so on) befitting to the function of the new node. In that regard, the central manager 401 can perform load balancing functions with respect to the nodes connected to the Bluetooth® mesh network 400 to balance computing, storage, or relay capacity of the system as a whole.

In one example, communications between the nodes are performed using messages that may be up to 384 bytes long when using a segmentation and reassembly (SAR) mechanism. Most messages can fit into one segment, which is 11 bytes in some examples. Each message may start with an opcode, which may be 1 byte (for special messages), 2 bytes (for standard messages), 3 bytes (for vendor-specific messages), or another suitable number of bytes.

Figure 5:
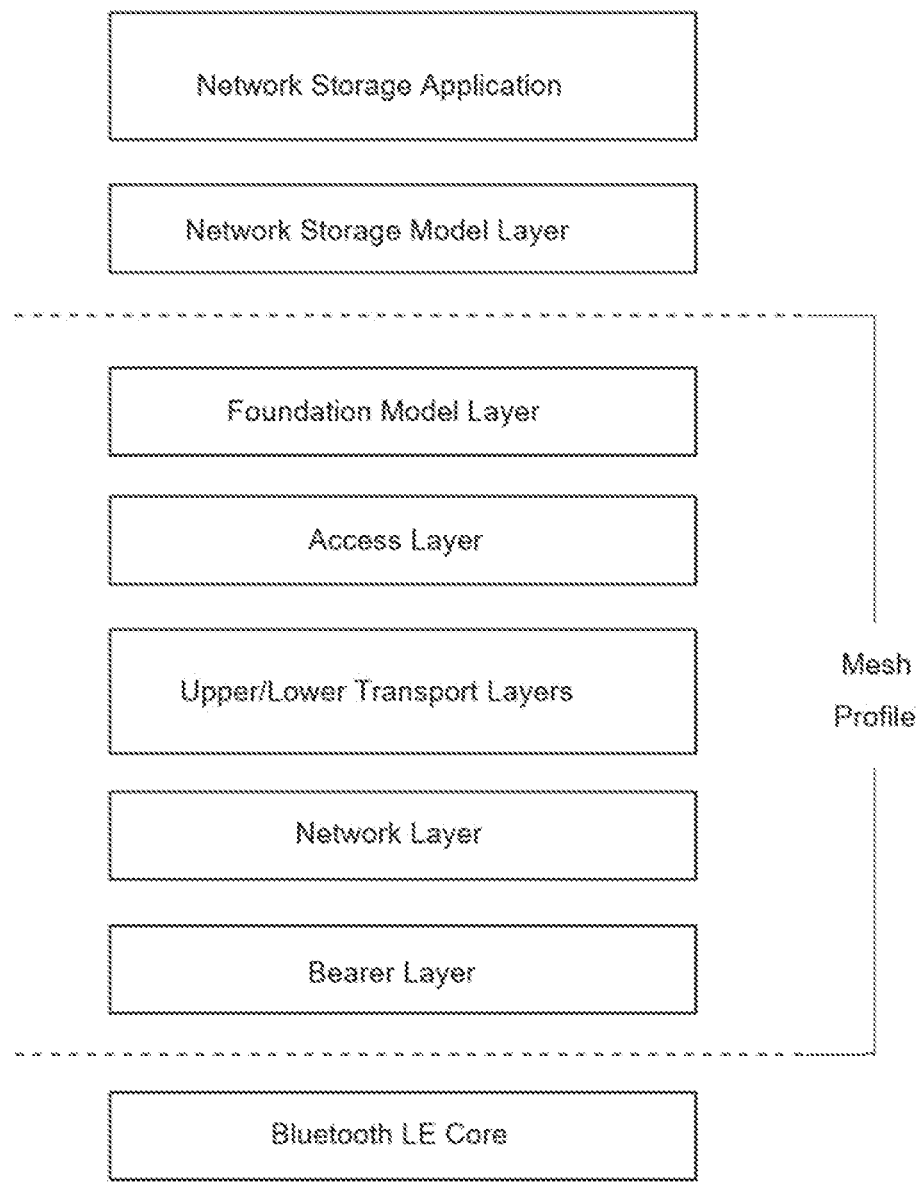
FIG. 5 is a table showing examples layers of a Bluetooth® mesh network and functions of those layers, according to some implementations.

In some examples, the Bluetooth® mesh network 100 (400) has a layered architecture. That is, the Bluetooth® mesh network 100 (400) has multiple layers, each providing different functions for enabling communications among nodes. FIG. 5 is a table showing examples layers of the Bluetooth® mesh network 100 (400), according to some implementations. Referring to FIGS. 1-5, the Bluetooth® mesh network 100 (400) may have, above a Bluetooth® LE core, at least a foundation model layer, an access layer, an upper transport layer, a lower transport layer, a network layer, and a bearer layer. These layers are defined in the Mesh Profile Bluetooth® Specification.

In some implementations, a network storage model layer is defined which includes the required states and messages to perform basic network storage primitives, including, but not limited to, session control packets, file access data packets and general message packets, on behalf of network storage applications. In some implementations, a network protocol, such as IPv6 and TCP, may be used over Bluetooth® Low Energy using IPv6 over Low-power Wireless Personal Area Network (6LoPAN) techniques according to the IETF RFC 7668 and BT Mesh over BT specifications, enabling the use of applications using network storage protocols such as iSCSI or SMB over TCP/IP.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout the previous description that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

It is understood that the specific order or hierarchy of steps in the processes disclosed is an example of illustrative approaches. Based upon design preferences, it is understood that the specific order or hierarchy of steps in the processes may be rearranged while remaining within the scope of the previous description. The accompanying method claims present elements of the various steps in a sample order and are not meant to be limited to the specific order or hierarchy presented.

The previous description of the disclosed implementations is provided to enable any person skilled in the art to make or use the disclosed subject matter. Various modifications to these implementations will be readily apparent to those skilled in the art, and the generic principles defined herein may be applied to other implementations without departing from the spirit or scope of the previous description. Thus, the previous description is not intended to be limited to the implementations shown herein but is to be accorded the widest scope consistent with the principles and novel features disclosed herein.

The various examples illustrated and described are provided merely as examples to illustrate various features of the claims. However, features shown and described with respect to any given example are not necessarily limited to the associated example and may be used or combined with other examples that are shown and described. Further, the claims are not intended to be limited by any one example.

The foregoing method descriptions and the process flow diagrams are provided merely as illustrative examples and are not intended to require or imply that the steps of various examples must be performed in the order presented. As will be appreciated by one of skill in the art the order of steps in the foregoing examples may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the examples disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The hardware used to implement the various illustrative logics, logical blocks, modules, and circuits described in connection with the examples disclosed herein may be implemented or performed with a general purpose processor, a DSP, an ASIC, an FPGA or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In some exemplary examples, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storages, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed examples is provided to enable any person skilled in the art to make or use the present disclosure. Various modifications to these examples will be readily apparent to those skilled in the art, and the generic principles defined herein may be applied to some examples without departing from the spirit or scope of the disclosure. Thus, the present disclosure is not intended to be limited to the examples shown herein but is to be accorded the widest scope consistent with the following claims and the principles and novel features disclosed herein.

What is claimed is:

1. A method for managing storage of data using a plurality of nodes, comprising:
   configuring a non-volatile storage in a node of the plurality of nodes as a network storage, wherein configuring includes upscaling a total storage capacity of the network storage provided by the plurality of nodes by an amount of the non-volatile storage in the node; and
   communicating data that is stored in the non-volatile storage of the node over the wireless network using a short-link radio technology in compliance with Bluetooth® standards with another node of the plurality of nodes using a network storage protocol.

2. The method of claim 1, wherein communicating data includes managing packets for supporting network storage applications using the network storage protocol.

3. The method of claim 1, further comprising:
   configuring, in the node, a short-link radio technology connector in compliance with Bluetooth® standards to communicate data over a mesh network in compliance with Bluetooth® standards and a network storage protocol.

4. The method of claim 1, further comprising:
   configuring a first group of one or more nodes of the plurality of nodes to subscribe to and publish on a first channel provided by the wireless network.

5. The method of claim 4, further comprising:
   receiving information published on the first channel by a node of the first group by other nodes in the first group via the first channel.

6. The method of claim 4, wherein the first group comprises a first storage node and a first compute node, the method further comprising:
   communicating storage read and storage write commands between the first storage node and the first compute node via the first channel.

7. The method of claim 6, further comprising:
   configuring a second group of one or more nodes of the plurality of nodes to subscribe to and publish on a second channel provided by the wireless network; and
   receiving information published on the second channel by a node of the second group by other nodes in the second group via the second channel.

8. The method of claim 7, wherein the second group comprises a second storage node and a second compute node, the method further comprising:
   communicating storage read and storage write commands between the second storage node and the second compute node via the second channel.

9. The method of claim 1, wherein the wireless network comprises a plurality of layers, the plurality of layers comprises a bearer layer and at least one transport layer.

10. The method of claim 1, wherein
    the plurality of nodes includes a storage node; and
    the non-volatile storage comprises a plurality of NAND memory devices.

11. A computer readable program product comprising non-transitory storage media that stores instructions which, when implemented by a processor, performs a method for managing storage of data using a plurality of nodes, comprising:
    configuring a non-volatile storage in a node of the plurality of nodes as a network storage, wherein configuring includes upscaling a total storage capacity of the network storage provided by the plurality of nodes by an amount of the non-volatile storage in the node; and communicating data that is stored in the non-volatile storage of the node over the wireless network using a short-link radio technology in compliance with Bluetooth® standards with another node of the plurality of nodes using a network storage protocol.

12. The computer-readable program product claim 11, wherein communicating data includes managing packets for supporting network storage applications using the network storage protocol.

13. The computer-readable program product claim 11, the method further comprising:

configuring, in the node, a short-link radio technology connector in compliance with Bluetooth® standards to communicate data over a mesh network in compliance with Bluetooth® standards and a network storage protocol.

14. The computer-readable program product claim 11, the method further comprising:

configuring a first group of one or more nodes of the plurality of nodes to subscribe to and publish on a first channel provided by the wireless network.

15. The computer-readable program product claim 14, the method further comprising:

receiving information published on the first channel by a node of the first group by other nodes in the first group via the first channel.

16. The computer-readable program product claim 14, wherein the first group comprises a first storage node and a first compute node, the method further comprising:

communicating storage read and storage write commands between the first storage node and the first compute node via the first channel.

17. The computer-readable program product claim 16, the method further comprising:

configuring a second group of one or more nodes of the plurality of nodes to subscribe to and publish on a second channel provided by the wireless network; and receiving information published on the second channel by a node of the second group by other nodes in the second group via the second channel.

18. The computer-readable program product claim 17, wherein the second group comprises a second storage node and a second compute node, the method further comprising:

communicating storage read and storage write commands between the second storage node and the second compute node via the second channel.

19. The computer-readable program product claim 11, wherein the wireless network comprises a plurality of layers, the plurality of layers comprises a bearer layer and at least one transport layer.

20. The computer-readable program product claim 11, wherein the plurality of nodes includes a storage node; and the non-volatile storage comprises a plurality of NAND memory devices.

* * * * *